US012113877B2

(12) United States Patent
Power et al.

(10) Patent No.: US 12,113,877 B2
(45) Date of Patent: *Oct. 8, 2024

(54) SYSTEM AND METHOD FOR IMPROVEMENTS TO A CONTENT DELIVERY NETWORK

(71) Applicant: Sandpiper CDN, LLC, Wilmington, DE (US)

(72) Inventors: William R. Power, Boulder, CO (US); Pawel Jakobowski, Strzebowiska (PL)

(73) Assignee: Sandpiper CDN, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,568

(22) Filed: May 24, 2023

(65) Prior Publication Data

US 2023/0300216 A1  Sep. 21, 2023

Related U.S. Application Data

(63) Continuation of application No. 17/561,883, filed on Dec. 24, 2021, now Pat. No. 11,665,259, which is a (Continued)

(51) Int. Cl.
*H04L 67/5681* (2022.01)
*H04L 67/289* (2022.01)
(Continued)

(52) U.S. Cl.
CPC ........ *H04L 67/5681* (2022.05); *H04L 67/289* (2013.01); *H04L 67/561* (2022.05);
(Continued)

(58) Field of Classification Search
CPC . H04L 67/5681; H04L 67/289; H04L 67/561; H04L 67/564; H04L 67/565; H04L 65/40
See application file for complete search history.

(56) References Cited

U.S. PATENT DOCUMENTS

2012/0198075 A1   8/2012  Crowe
2013/0117349 A1   5/2013  Burnette
(Continued)

FOREIGN PATENT DOCUMENTS

WO   WO-2016075135   5/2016

OTHER PUBLICATIONS

European Examination Report, dated Feb. 5, 2021, Application No. 17857349.9, filed Sep. 27, 2017; 6 pgs.
(Continued)

*Primary Examiner* — Tom Y Chang
(74) *Attorney, Agent, or Firm* — C. Tumey Law Group PLLC

(57) ABSTRACT

Provided is a content delivery method and architecture for ways to improve the caching of content at one or more content providing devices of a Content Delivery Network (CDN). In particular, systems and methods are disclosed that vary the requirements to store resources or content within a caching device using a dynamic popularity threshold. This popularity threshold may be varied based on a measured fullness of the storage capacity of the cache device. In another example, the dynamic popularity threshold may be further varied based on a cache pressure, which is an indication of how often the cache replaces stored items with new items. The adjustment to the popularity threshold for caching particular content at the caching device may thus be based on a number of requests for content received at the device to tune the caching procedure for a particular region of the CDN.

17 Claims, 5 Drawing Sheets

Related U.S. Application Data continuation of application No. 17/131,889, filed on Dec. 23, 2020, now Pat. No. 11,252,254, which is a continuation of application No. 15/717,623, filed on Sep. 27, 2017, now Pat. No. 10,880,395.

(60) Provisional application No. 62/400,357, filed on Sep. 27, 2016.

(51) Int. Cl.
  *H04L 67/561* (2022.01)
  *H04L 67/564* (2022.01)
  *H04L 67/568* (2022.01)
  *H04L 65/40* (2022.01)

(52) U.S. Cl.
  CPC .......... *H04L 67/564* (2022.05); *H04L 67/568* (2022.05); *H04L 65/40* (2013.01)

(56) References Cited

U.S. PATENT DOCUMENTS

| | | | |
|---|---|---|---|
| 2014/0044127 A1* | 2/2014 | Li | H04L 67/5682 370/389 |
| 2014/0101687 A1 | 4/2014 | DeCenzo | |
| 2014/0149533 A1 | 5/2014 | Bergman | |
| 2014/0172944 A1 | 6/2014 | Newton et al. | |
| 2014/0240913 A1 | 8/2014 | Vyshetsky | |
| 2015/0134914 A1 | 5/2015 | Ash | |
| 2015/0356021 A1 | 12/2015 | Benoit | |
| 2016/0085674 A1 | 3/2016 | Sterns | |
| 2017/0131948 A1 | 5/2017 | Hoang | |
| 2017/0168944 A1 | 6/2017 | van Greunen | |
| 2018/0091619 A1 | 3/2018 | Power et al. | |
| 2021/0112134 A1 | 4/2021 | Power | |
| 2022/0116474 A1 | 4/2022 | Power | |

OTHER PUBLICATIONS

Extended European Search Report, dated Mar. 13, 2020, Application No. 17857349.9, filed Sep. 27, 2017; 10 pgs.

International Preliminary Report on Patentability, dated Apr. 2, 2019, Int'l. Appl. No. PCT/US17/053775, Int'l Filing Date Sep. 27, 2017; 7 pgs.

International Search Report dated Dec. 5, 2017, Int'l. Appl. No. PCT/US17/053775, Int'l Filing Date Sep. 27, 2017; 3 pgs.

Written Opinion of the International Searching Authority dated Dec. 5, 2017, Int'l. Appl. No. PCT/US17/053775, Int'l Filing Date Sep. 27, 2017; 5 pgs.

\* cited by examiner

| Cache fullness | <50% | | 50%-70% | | 70%-90% | | >90% | |
|---|---|---|---|---|---|---|---|---|
| | Scaling factor | Resulting threshold | Scaling factor | Resulting threshold | Scaling factor | Resulting threshold | Scaling factor | Resulting threshold |
| Example Scaling Scheme #1 | .5 | (2.5) | 1 | (5) | 1.5 | (7.5) | 2 | (10) |
| Example Scaling Scheme #2 | 1 | (5) | 1.2 | (6) | 1.3 | (6.5) | 1.4 | (7) |
| Example Scaling Scheme #3 | % | (% x 5) | % / .5 | (%/.5x5) | % / .3 | (%/.3x5) | % / .1 | (%/.1x5) |

FIG. 3

SYSTEM AND METHOD FOR IMPROVEMENTS TO A CONTENT DELIVERY NETWORK

TECHNICAL FIELD

The present disclosure relates to content delivery networks and more specifically to improving caching within content delivery networks.

BACKGROUND

A content delivery network (CDN) is a sophisticated and large collection of computers (e.g., content servers) and networking devices that is used to deliver various forms of content, such as video, web pages, and images, to devices over networks including the Internet. So, for example, when a user operating a smart phone, laptop, tablet or other computing device requests a video to play on the device, a CDN may be contacted and deliver the video to the computing device where it is played. As more and more content is delivered over networks, refinements and advances to CDNs, as well as the infrastructure supporting the CDN, are needed and happening constantly. Such advances involve reducing cost, increasing capacity, optimizing from where in the CDN content is delivered and where it is stored to optimize delivery, among other challenges.

In order to reduce latency, CDNs may utilize a distributed network of servers to hold data for the content providers so that when a user requests data from the network, the request can be filled by a server which is geographically closest to the user. For example, a website content provider in California may deploy caches on servers located on the East Coast, in Europe, and in Asia. Each cache can hold copies of the website content, such that when a user in London requests access to the website, the user is presented the requested data from the European cache. By providing the content from a server geographically near the requesting device, the latency of providing the content is reduced and the efficiency of the network is increased.

However, because the size and bandwidth of the caches of the various servers of the CDN may be limited, systems often make determinations regarding what content is cached and what content is stored at tiers deeper into the network. These determinations can be further complicated when the number of requests for content from a particular server exceed the server's capacity to track information about the requests. In addition, determinations regarding what content should be stored can be complicated by the use of mixed caches, where drives used to form the cache have distinct capacities and capabilities.

SUMMARY

Disclosed are systems, methods, and non-transitory computer-readable storage media for improving caching within Content Delivery Networks (CDNs). Systems configured according to this disclosure can vary the requirements to store resources within the cache using a "dynamic popularity threshold," where the requirements to store resources within the cache vary based on how full the cache is. The dynamic popularity threshold can be further varied based on the "cache pressure," an indication of how often the cache needs to replace stored items with new (more popular items).

Because caching can involve a mix of different storage devices, such as SSD (Solid State Drive) and HDD (Hard Disk Drive) drives, each with their own storage capabilities, caching processes can select where to store resources within the cache. Systems configured as disclosed herein can promote or demote resources between these storage devices, such that overall cache performance can be enhanced.

In addition, in a proxy cache environment, caches can see an extremely large number of unique client requests, such that traditional methods of metadata storage and tracking may become ineffective. More specifically, the cache may receive a high number of requests such that the cache device may not have enough server memory to track information about each request. Systems configured according to this disclosure can use a statistical sampling of the request stream to reduce the amount of information that is tracked in server memory, such that resources which are unpopular are statistically unlikely to pass through a statistical sampling filter, while resources which are popular are statistically likely to pass through the filter and be tracked in memory.

These concepts and improvements can be used individually or in combination. For example, the promotion/demotion of elements within the cache can utilize the dynamic popularity threshold and cache pressure concepts. Similarly, the statistical filtering of resource requests can use the promotion/demotion elements, the cache pressure element, and/or the dynamic popularity threshold.

One implementation of the present disclosure may take the form of a method operating a telecommunications network. The method may include the operations of measuring a percentage of storage capacity at a cache node of a content delivery network (CDN) and scaling a resource caching popularity threshold value based on the measured percentage of storage capacity at the cache node, the resource caching popularity threshold value corresponding to a threshold of requests for a particular resource received at the cache node at which the particular resource is cached within a cache node storage system. The method may also include receiving, at the cache node, a request for the particular resource available from the CDN, comparing a resource popularity counter associated with the particular resource to the scaled resource caching popularity threshold value, and caching the particular resource in the cache node storage system when the resource popularity counter exceeds the scaled resource caching threshold value.

Another implementation of the present disclosure may take the form of a networking system comprising at least one communication port for receiving requests for content maintained by a content delivery network (CDN), a storage system for storing content of the CDN, a processing device, and a computer-readable medium connected to the processing device. The computer-readable medium is configured to store instructions that, when executed by the processing device, performs certain operations. Such operations may include measuring a percentage of storage capacity at the storage system, scaling a content caching popularity threshold value for the cache node based on the measured percentage of storage capacity, the content caching popularity threshold value corresponding to a threshold of requests for a particular content received at the cache node at which the particular content is cached within the storage system, comparing a content popularity counter associated with the particular content to the scaled content caching popularity threshold value upon receiving a request for the particular content, and caching the particular content in the storage system when the content popularity counter exceeds the scaled content caching threshold value.

BRIEF DESCRIPTION OF THE DRAWINGS

FIG. 3 is a diagram of various scaling schemes for scaling a threshold value based on storage capacity utilized in a caching resource decision of a CDN.

DETAILED DESCRIPTION

Aspects of the present disclosure involve a content delivery method and ways to improve the caching of content at one or more content providing devices of a Content Delivery Network (CDN). In particular, systems and methods are disclosed that vary the requirements to store resources or content within a caching device using a "dynamic popularity threshold". This popularity threshold may vary based on many factors of the caching device and the CDN in general. For example, the popularity threshold may be varied based on a measured fullness of the storage capacity of the cache device. In another example, the dynamic popularity threshold may be further varied based on a "cache pressure," which is an indication of how often the cache replaces stored items with new (more popular) items. The adjustment to the popularity threshold for caching particular content at the caching device may thus be based on a number of requests for content received at the device to tune the caching procedure for a particular region of the CDN.

In addition, because caching may involve a mix of different storage device types, such as SSD (Solid State Drive) and/or HDD (Hard Disk Drive) storage devices each with their own storage capabilities, caching processes can select where to store resources within the cache based on the popularity threshold value calculated for each content stored at the cache. Also, content may be promoted or demoted between the storage devices to further enhance overall cache performance.

Also, in a proxy cache environment, some cache devices may receive an extremely large number of unique client requests such that traditional methods of metadata storage and tracking may become ineffective. More specifically, the cache may receive a high number of requests such that the cache device may not have enough server memory to track information about each request. Systems configured according to this disclosure can therefore utilize a statistical sampling of the request stream from requesting devices to reduce the amount of information that is tracked (i.e., stored) in server memory, such that resources which are unpopular are statistically unlikely to pass through a statistical sampling filter, while resources which are popular are more likely to pass through the filter and be tracked in memory. This operates to reduce the amount of metadata storage of content that is unlikely to exceed the popularity threshold for the cache device.

The present disclosure addresses improvements to caching for Content Delivery Networks (CDNs). A brief introductory description of a basic CDN is provided in FIG. 1 which can be employed to practice the concepts is disclosed herein. A more detailed description of improvements to CDN caching will then follow.

Figure 1:
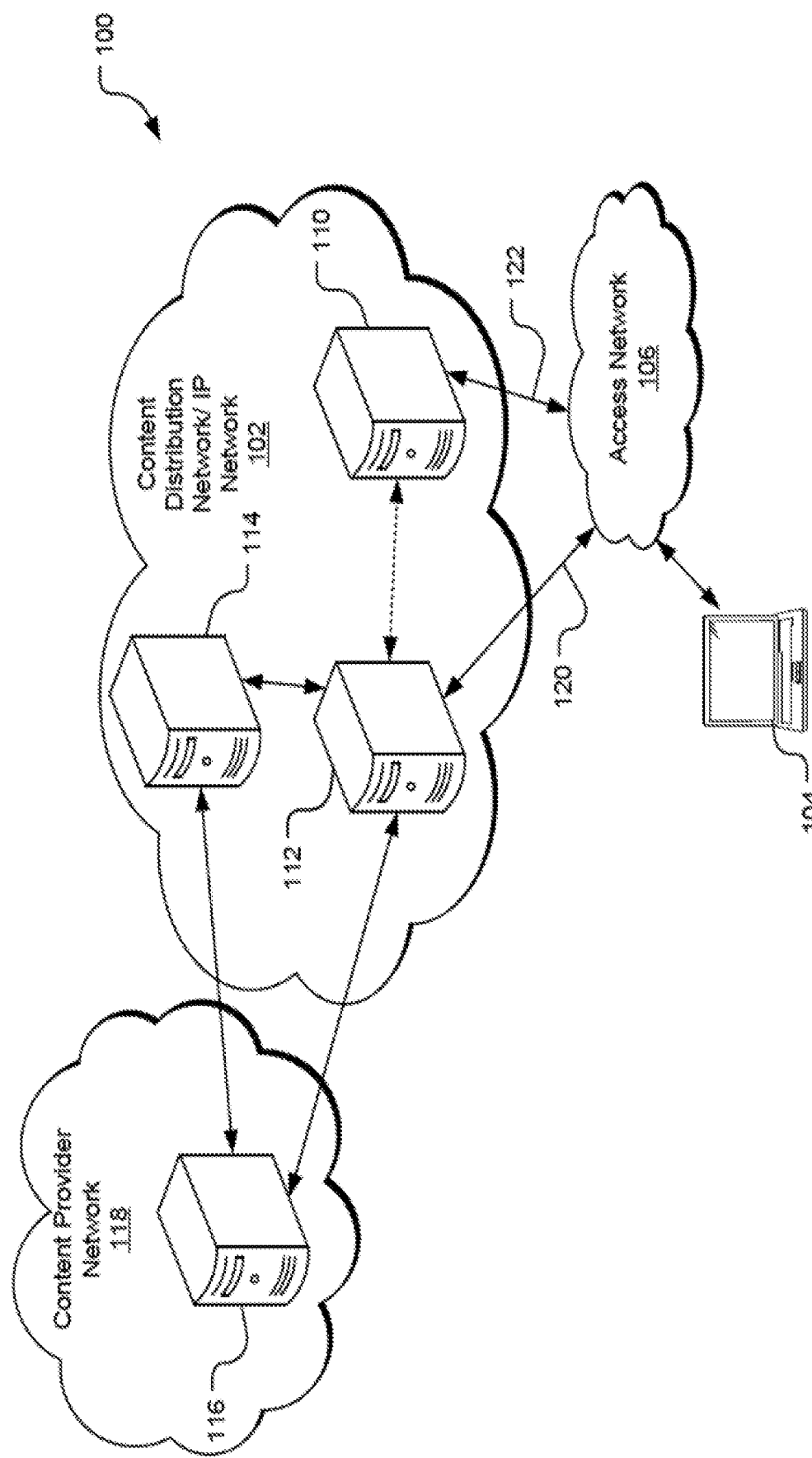
FIG. 1 is an example network environment for distributing content to an end user from a network, such as a content delivery network (CDN).

FIG. 1 is a network environment 100 for distributing content to one or more users. In general, the network environment 100 receives a request for content from a user of the network and determines a server or content providing component within the network to provide the content to the user. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks. In yet another embodiment, the user device 104 may be a component of access network 106.

The CDN 102 is capable of providing content to a user device 104, which is generally any form of computing device, such as a personal computer, mobile device, tablet (e.g., iPad™) set-top box, or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 or several such servers or devices in the CDN 102.

The directory server 110 responds to the request from the end user device 104 or access network 106 by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to devices, including user device 104, accessing the network throughout a large geographic area . . . . The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In addition, the CDN may broadcast to the access networks 106,108 connected to the CDN information concerning the content serving nodes available in the CDN. In particular, the CDN may broadcast Border Gateway Protocol (BGP) information about the access path to content serving CDN components. In general, BGP information (or BGP session, BGP feed or BGP data) is a table of Internet Protocol (IP) prefixes which designate network connectivity between autonomous systems (AS) or within AS networks. BGP information for a network route may include path, network policies and/or rule-sets for transmission along the path, among other information. The BGP feed may also include Interior Gateway Protocol (IGP) information for network routes within an AS or network and/or other network information that pertains to the transmission of content from the CDN.

As mentioned, the BGP information may include a path that designates the networks through which stored content may be accessed. In particular, a CDN may broadcast a network autonomous system (AS) identifier as part of the BGP announcement. The network identifier identifies the particular network that the content is stored on and available to an end user device. Additional network autonomous system identifiers between the end user device 104 and the stored content may be appended to or added to the BGP path information for the content. Thus, in one embodiment, the BGP path information may provide a series of identifiers for networks through which the content may be accessed by the end user device 104. This information may be manipulated by the CDN or other network to potentially reduce the transmission time of the content through one or more of the connected networks.

In one implementation, a user of the user computing device 104 enters a link name (e.g., URL or other identifier) into a browser executed on the computing device. The link name is associated with a network address within the CDN 102 at which the content may be obtained and provided to the computing device. For example, the user of the user device 104 may enter a URL such as www.example.com/content into the browser of the computing device. Upon entering the URL, the hostname may be extracted by the browser (www.example.com in this particular case) and sends a request (possibly via an operating system running within the computing device 104) to a domain name server (DNS) associated with the user's access network 106. Thus, the computing device 104 transmits the request for a content-serving device to the DNS that includes the hostname of the requested content.

As mentioned above, the CDN 102 may include one or more edge servers 112 which may cache content from another server to make it available in a more geographically or logically proximate location to requesting devices. However, as cache servers or devices improve, several tradeoffs may be considered when deciding what content is cached and what content is maintained at higher tiers of the CDN, such as mid-level or parent servers within the CDN. In particular, many cache devices or connected cache devices (also referred to as "cache nodes") now include both SSD (Solid State Drive) and HDD (Hard Disk Drive) storage drives, each with their own storage capabilities. In general, HDD storage drives have larger storage capacity, but with a larger latency in obtaining the stored information from the drive. In contrast, SSD storage drives are often limited in their storage capacity, but offer very low latency when obtaining the stored data. Thus, cache nodes may determine which type of disk drive is utilized to store cached content for access by a requesting device. In addition, CDNs also may determine when content may be cached and when content is maintained elsewhere in the network to improve the operation efficiency of the overall CDN. Several mechanisms or schemes are provided below to aid a CDN in determining how and when content available from the CDN is cached at a cache device within the CDN and when content should be served from a higher tier of the network.

Dynamic Popularity Threshold:

In one embodiment of the CDN, caching devices (such as edge device 112 of CDN 102) may utilize a counter or other measurement to determine a popularity of an instance of content to determine if that content is to be cached at an edge server or edge node. For example, edge device 112 may receive any number of requests for content from any number of customers 104 of the access network 106. These requests may be for the same content or for different content available from the CDN 102. Each request received at the cache device 112 for a particular content or resource may result in incrementing a counter associated with that resource by the cache device. In one particular implementation, the counter for a resource is incremented when a URL associated with a particular content to access that resource is received at the cache. For example, user device 104 may provide URL www.example.com to the edge device 112 to request access to or to receive content associated with that URL. In response, the edge device 112 may increment a counter for each receipt of that particular URL. Other counters may also be utilized for other URLs and/or content available from the CDN 102. When the counter for a specific resource hits a threshold number of requests, the proxy cache may determine that the threshold has been met and requests and stores that resource in a local cache storage device. In one particular example, assume the popularity threshold for a specific content is set to 5. Once the proxy cache device receives a $5^{th}$ URL request for that resource, the edge device 112 will request the content from a higher tier of the CDN 102 (such as from the content provider network 118) and store the content locally at the edge device 112. In some instances, a time limit may be applied to the incrementing of the popularity threshold such that the threshold may be decremented or reset to zero at the expiration of the time limit. In general, the popularity threshold provides faster transmission of the content in response to future requests for the content received at the edge device, regardless of from which user device 104 the request is received.

A potential issue with this approach is that the popularity threshold is typically static across all cache devices of the CDN 102 which may not account for differing traffic levels on different caches within the network. That is, a cache device 112 that receives many requests, the threshold may be exceeded and the resource cached quickly. However, on another less busy cache device, the threshold is unlikely to be met such that the content is never cached or may take some time before caching. For example, a cache device for video content located within the CDN 102 near New York City may receive many requests and quickly be filled due to the number of people requesting the video. Alternatively a similar cache near Omaha, Nebraska may remain mostly empty over the same time period, with the cause of the disparity largely due the relatively fewer requests received from a smaller populace located geographically nearer the cache device.

To remedy this circumstance, systems configured according to this disclosure may utilize a dynamic popularity threshold which increases or decreases the counter threshold value associated with a particular resource based on local traffic conditions at the cache (i.e., how many requests are being made to the server), among other considerations. The counter threshold can also be based on population density and/or size within a geographic threshold from the physical location of the proxy server. For example, the initial popularity threshold for a proxy cache near a moderately populated city may be 5 requests, whereas a proxy cache near a large populated city may have a popularity threshold of 10 requests. Again, the popularity threshold value may be utilized by the cache device to determine when a content or resource is stored at the cache. Thus, for the cache device near the moderately populated city, the $5^{th}$ request for the content received at the cache device triggers the local storage of the content. In another example of using a popularity threshold value, the proxy cache device, while nominally set at 5 requests, may dynamically vary the value in response to measured performance values of the CDN, such as setting the popularity threshold at a low value during measured low traffic conditions, to a nominal value during a measured average traffic condition, and to a high value during a measured heavy traffic condition.

Figure 2:
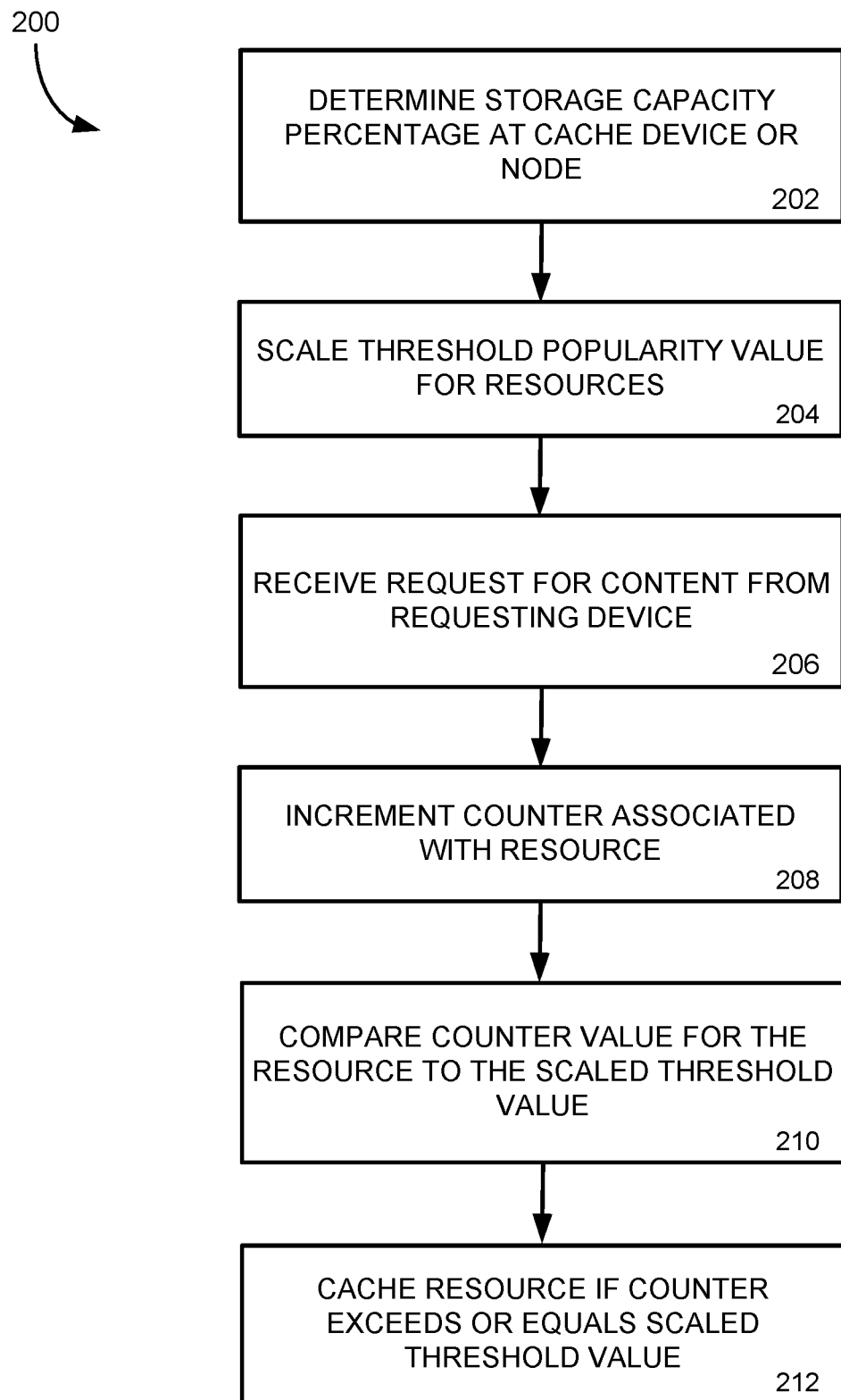
FIG. 2 is a flowchart of a method for scaling a threshold value based on storage capacity utilized in a caching resource decision.

One particular example for dynamically adjusting a popularity threshold value of a cache device of a CDN is illustrated in the flowchart of FIG. 2. In particular, FIG. 2 is a flowchart of a method 200 for utilizing a calculated percentage of used storage of a cache device or node to dynamically adjust a popularity threshold value. In general, the operations of the method 200 may be performed by one or more devices of a CDN to aid the CDN in providing content or resources to a requesting device. In one particular example, an edge device (such as device content server 112) of the CDN 102 may perform the operations of the method, although any component of the CDN or in communication with the CDN may perform one or more of the operations of the method. Further still, in some instances a cache of a CDN may comprise several storage devices and be referred to as a cache node. Thus, a controlling component of the CDN 102 may execute the operations of the described method 200.

Beginning in operation 202, the CDN 102 calculates a storage capacity percentage for the cache device 112 or cache node. For example, the CDN 102 may determine that 50% of the total storage capacity to cache content at the cache device is currently utilized by the device. In operation 204, the CDN 102 scales a corresponding threshold popularity value for caching resources in the cache based on the determined storage capacity percentage. In general, if the percentage of available storage capacity of the cache is high, then the threshold popularity value for caching a resource is lowered such that more resources may be cached at the device 112 or node. Alternatively, if the percentage of available storage capacity of the cache is low, then the threshold popularity value for caching a resource may be raised so that fewer resources are cached at the node. The scaling of the popularity threshold value is described in more detail below.

With the scaled threshold value determined or set for the cache node, the cache device 112 or node may begin caching resources utilizing the adjusted popularity threshold value. For example, in operation 206, the cache or edge device 112 receives a request for content from a requesting device 104, with such a request included a URL through which the content is available. Upon receiving the request, the CDN 102 may increment a popularity or request counter for that resource in operation 208. In operation 210, the CDN 102 compares the popularity counter for the requested resource to the popularity threshold value for the edge device 112, the popularity threshold value based at least on the percentage of utilized cache memory space. In general, if the request counter value exceeds or, in some instances, equals the scaled popularity threshold value, the resource is requested from an upper tier of the CDN 102 and cached at the cache device 112 or node. In some instances, the CDN 102 may return to operation 202 of method 200 to recalculate the available storage capacity of the cache and being the method 200 again for additionally received requests for content from users of the CDN.

The amount of adjustment or variance applied to the popularity threshold value for the caching node may be calculated in many different ways. Several examples for scaling of the threshold value based on a measured storage capacity for a cache node and used to determine when a resource is cached is illustrated in the diagram of FIG. 3. However, it should be appreciated that the scaling schemes illustrated in FIG. 3 are but examples and any scaling scheme may be utilized by the CDN to dynamically vary a popularity threshold for a caching node of a CDN in response to a measured storage capacity of the node.

The table 300 of FIG. 3 includes three scaling schemes 302-306 that may be applied to an initial popularity threshold value of 5 for a particular CDN caching node. It should be appreciated, however, that the initial popularity threshold value for the caching node may be any value and that 5 requests for caching a resource is merely used herein as an example. Further, the scaling schemes 302-306 for the popularity threshold value is based on four ranges 308-314 of measured cache storage fullness (namely <50%, 50%-70%, 70%-90%, and >90%). Again, these cache fullness ranges are selected as mere examples and any number of ranges and any percentages of utilized storage capacity may be used to define the boundaries of those ranges. In general, the scaling of the popularity threshold value for a caching node may be linear or non-linear using predefined values or functions.

In example scaling scheme #1 302, the scaling factor increases by 0.5 when the measured percentage fullness of the cache memory enters a new range 308-314. For example, a measured cache fullness for the node less than 50% utilizes a scaling factor of 0.5 to the initial threshold value. Thus, because the initial threshold value in this example is 5, the scaled or adjusted popularity threshold value for the cache when the cache fullness is less than 50% is 2.5. In other words, the cache node may cache a resource when a third request for the particular resource is received at the cache node. At some point, however, the cache fullness may increase to be above 50% and a new threshold value may be calculated. In particular, for a measured cache storage fullness of 50%-70%, the scaling factor of 1 may be applied such that the adjusted threshold value is 5 (the same as the initial threshold value). Similar increases in the measured cache fullness (between 70%-90% cache fullness 312) may result in the application of a scaling factor of 1.5 to the initial threshold value, increasing the value to 7.5. Thus, as the cache storage space is now more limited, a resource will not be cached by the cache node until the $8^{th}$ request for the content is received. Finally, for a measured cache fullness above 90% 314, the scaling factor may be 2 resulting in a scaled threshold value for caching a resource at 10 requests.

Example scaling scheme #2 304 may take a similar approach by increasing the scaling factor as more of the cache storage capacity is consumed. However, example scaling scheme #2 304 may not increase the scaling factor as much as in the previous example. Here, the scaling factor increases by 0.1 or 0.2 as the measured cache storage fullness increases. The scaling factor in this example may range from 1 (for a measured cache fullness less than 50% 308) up to 1.4 (for a measured cache fullness over 90% 314). This particular scheme may be utilized when the variance of the adjusted threshold value is lessened.

Example scaling scheme #3 306 utilizes the measured storage capacity directly to calculate and adjust the popularity threshold value. In particular, in the first region 308, the popularity threshold is the calculated percentage capacity times the initial threshold value (as shown by (%×5) in the table 300). For the second region 310, the popularity threshold is the calculated percentage divided by 0.5 times the initial threshold value. As above, the threshold value for scaling scheme #3 306 increases as more of the cache storage is consumed by cached resources.

In this manner, the overall popularity threshold (aka the effective popularity) can be adjusted in real-time based on actual cache conditions. The CDN 102, or individual servers 112 themselves, can calculate the popularity threshold based on actual conditions detected within the storage of the cache device. In one example, the Popularity Threshold can be based on a function of the fullness, which can be written in a variety of ways:

$$\text{Popularity Threshold (PT)} = \text{Scaling Factor (SF)} \times \text{Default Threshold} \quad \text{Equation (1):}$$

$$PT = \text{function of cache Fullness (F)} \times \text{function of population density} \quad \text{Equation (2):}$$

Further, the popularity threshold value utilized to determine when a resource is cached can be determined using additional factors of the cache device or node.

Cache Pressure:

In some instances, the popularity threshold can be further modified based on a measured number of overall requests received at the cache, sometimes referred to herein as a "cache pressure". In general, the cache pressure is determined by monitoring the activity directed at the cache device or cache node 112 in relation the storage space consumed at the cache node. For example, the cache 112 will often delete old resources from storage as new resources are cached or the time for retention of the old resource times out. The rate at which resources are deleted from the cache may be measured in Mb per second and may be included in the cache pressure measurement discussed herein. As such, the pressure at the cache device or node may be measured through monitoring the writing to the storage disk of the cache node and/or the resource evictions from memory, with this measurement being used to dynamically adjust the popularity threshold value.

Tying the popularity threshold value to cache pressure may provide several operational advantages to the caching system of the CDN 102 over previous caching systems. For example, SSD storage drives typically have a finite amount of data that can be written to the drive over the lifetime of the drive. In one particular example, the SSD may have a lifetime limit of 500 TB of data written to the drive before the drive must be replaced. By monitoring the amount of data written to the SSD storage device, the longevity of the lifetime of the SSD may be managed. Thus, if the popularity threshold value is increased as the pressure on the cache to store information increases, the resources that are cached at the cache device or node may be limited and, subsequently, limits the turnover of data in the SSD. By controlling the amount of data written to and deleted from the SSD storage disk, the longevity of the drive may be controlled. Further, by including cache pressure in the algorithm/calculation of the popularity threshold, filling the cache with resources that are no longer popular may be avoided.

One exemplary calculation of cache pressure could be:

$$\text{Cache Pressure (CP)} = (\text{Data requests in the past hour})/\text{Disk Size} \quad \text{Equation (3):}$$

with a more detailed calculation of cache pressure of:

$$CP = (\text{Lifetime writes to the cache}/\text{Lifetime available writes}) + (\text{Data requests in the past hour}/\text{Disk Size}). \quad \text{Equation (4):}$$

Regardless of how the cache pressure on the node is calculated, the cache pressure may be included in the adjustment to the popularity threshold value for the cache node. For example, a cache node 112 may utilize the following equation:

$$PT = CP \times \text{Scaling Factor} \times \text{Initial Threshold} \quad \text{Equation (5):}$$

to dynamically adjust a popularity threshold value for the cache node, taking into account both the scaling factor discussed above and the cache pressure on the node. In another implementation, the cache pressure may be the only adjustment to the popularity threshold value applied by the cache node.

Over time, the cache device or node 112 may attain equilibrium for a popularity threshold value by monitoring the fullness factor of the storage, the cache pressure, how long resources should be held in the cache, the effective popularity of a resource, etc. For example, a cache which is initially empty may rapidly cache resources being requested, with few requests not resulting in the caching of the associated resource. However, through the embodiments of the caching system and schemes provided herein, caching of resources will become scarcer (i.e., a resource will receive more requests or be more popular to be added to the cache) as the cache storage begins to fill.

Popularity Promotion/Demotion:

In yet another scheme to improve the caching decision in a cache node, the CDN cache 112 may utilize the different types of storage drives associated with the node differently. As explained above, the cache device or node 112 may include a mix of different storage components and drives, such as SSDs and HDDs. Given the higher costs but the relative speed of providing content of SSD disks, cost savings and overall system efficiency occur when the SSDs are generally used to store the most popular resources, with less popular resources being stored on HDD of the cache node 112.

In some instances, the popularity of resources being stored in a cache node 112 may shift over time. For example, a once popular resource which is stored in an SSD may attain a diminished popularity at a later date or time. Because an efficient cache node 112 stores the most popular resources on the SSDs of the node and less popular resources on the HDDs, the resource with decreased popularity may be demoted to storage in the HDD drive. Similarly, resources stored in an HDD may, when their popularity increases, be promoted such that it should be stored in an SSD. In other words, resources previously stored in one component should be shifted to another component as the relative popularity of those resources shift over time.

Determinations regarding if the resource should be promoted, demoted, or even removed can be made in conjunction with the other principles disclosed herein. For example, the CDN 102 or cache node 112 may utilize the popularity threshold discussed above to make promotion/demotion determinations for resources on storage devices. In particular, for a resource A stored on an HDD of the cache node 112, promotion to an SSD may occur if popularity (P) of resource A is >Threshold. In another example, for a resource B stored on an SSD of the cache node 112, demotion to an HDD may occur if popularity (P) of resource B is <=Threshold. In general, however, other metrics by which a promotion or demotion of resources from one type of storage device to another may also be utilized by the cache node 112 of the CDN 102. Further, if storage devices other than SSDs and HDDs were being used by a cache 112, similar principles may be applied of moving resources after they had been cached to other types of storage components. In addition, the threshold values utilized in the determination of promotion/demotion of a resource may further be determined based on cache pressure as well as the statistical filtering and caching discussed below.

Statistical Metadata Filtering:

In a proxy cache environment of a CDN 102, a particular cache device or node 112 may receive an extremely large number of unique client requests for content or resources (as much as billions of requests per day). As such, traditional approaches to metadata storage where each request is individually stored and counted may quickly become ineffective at large numbers of requests. That is, the cache device or node 112 may receive so many requests for data (such as URLs) in the request stream that it may not have enough server memory to track or store metadata for each received request. This may negatively affect the performance of a cache device or node 112 by consuming storage space within the cache needlessly with metadata for resources that are not popular and is unlikely to be cached. As described above, a cache node 112 may associate a counter for each requested resource to determine the popularity of a particular resource at the cache node. This counter, like a lot of resource request metadata, is stored in memory at the cache node, along with some identifier or other metadata (such as the URL of the request) to identify the resource of the request and tie the counter to the particular requested resource. As every URL of the received requests is typically stored and tracked, metadata for many un-popular resources is often stored and tracked by the cache node although the counter for each resource may not be incremented by additional requests for the resource.

To address this issue, one implementation of the CDN 102 or cache node 112 may utilize statistical sampling of the incoming stream of requests in an attempt to reduce the amount of information that is tracked in cache server memory. Using this approach, resources that are unpopular are proportionally unlikely to pass through the statistical sampling filter such that the cache node 112 can avoid wasting memory space to track the unpopular resources. Similarly, resources that are more popular are more likely to pass the statistical filter and be tracked in memory.

Figure 4:
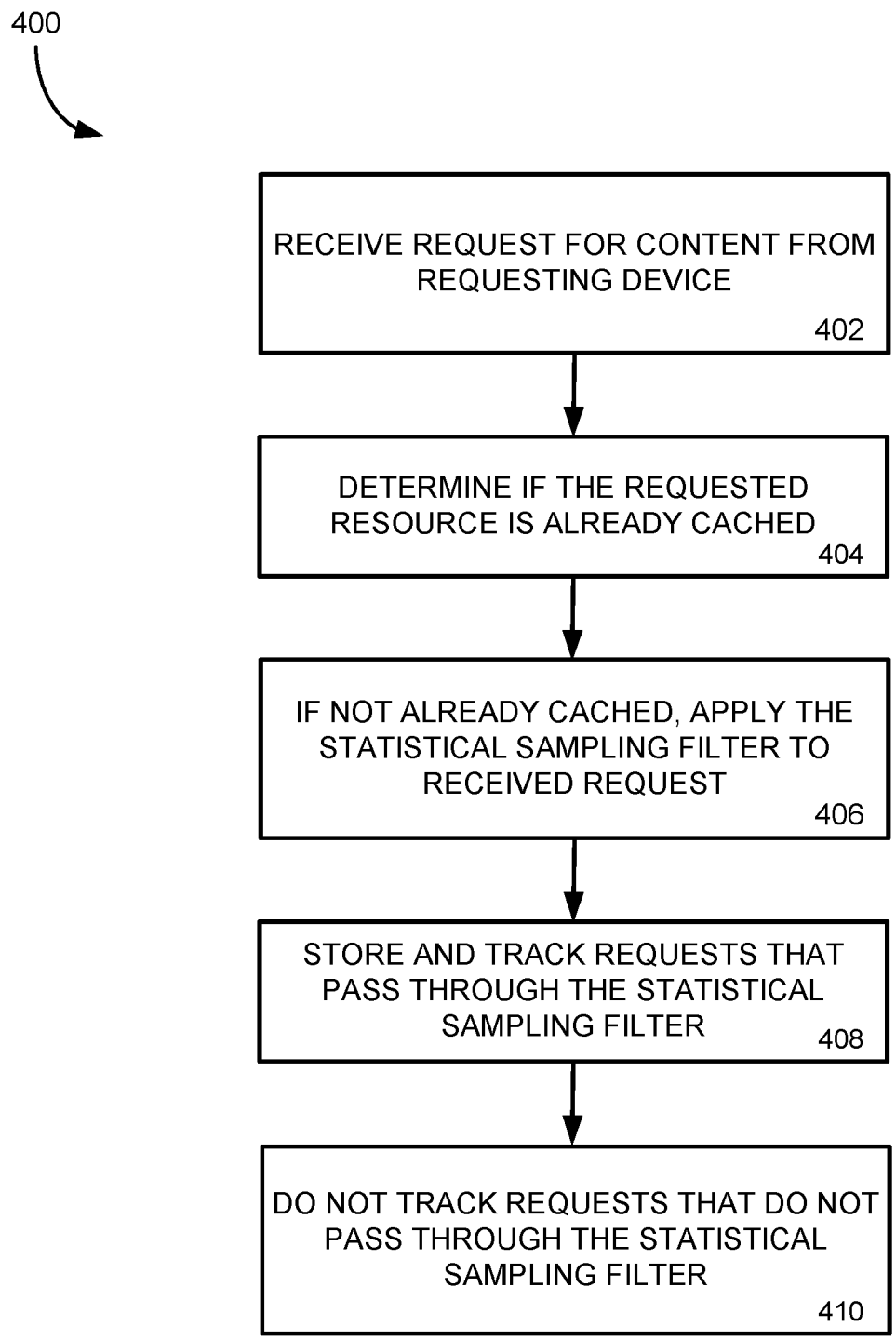
FIG. 4 is a flowchart of a method for applying a metadata filter based on statistical modeling utilized in a caching resource decision.
Figure 5:
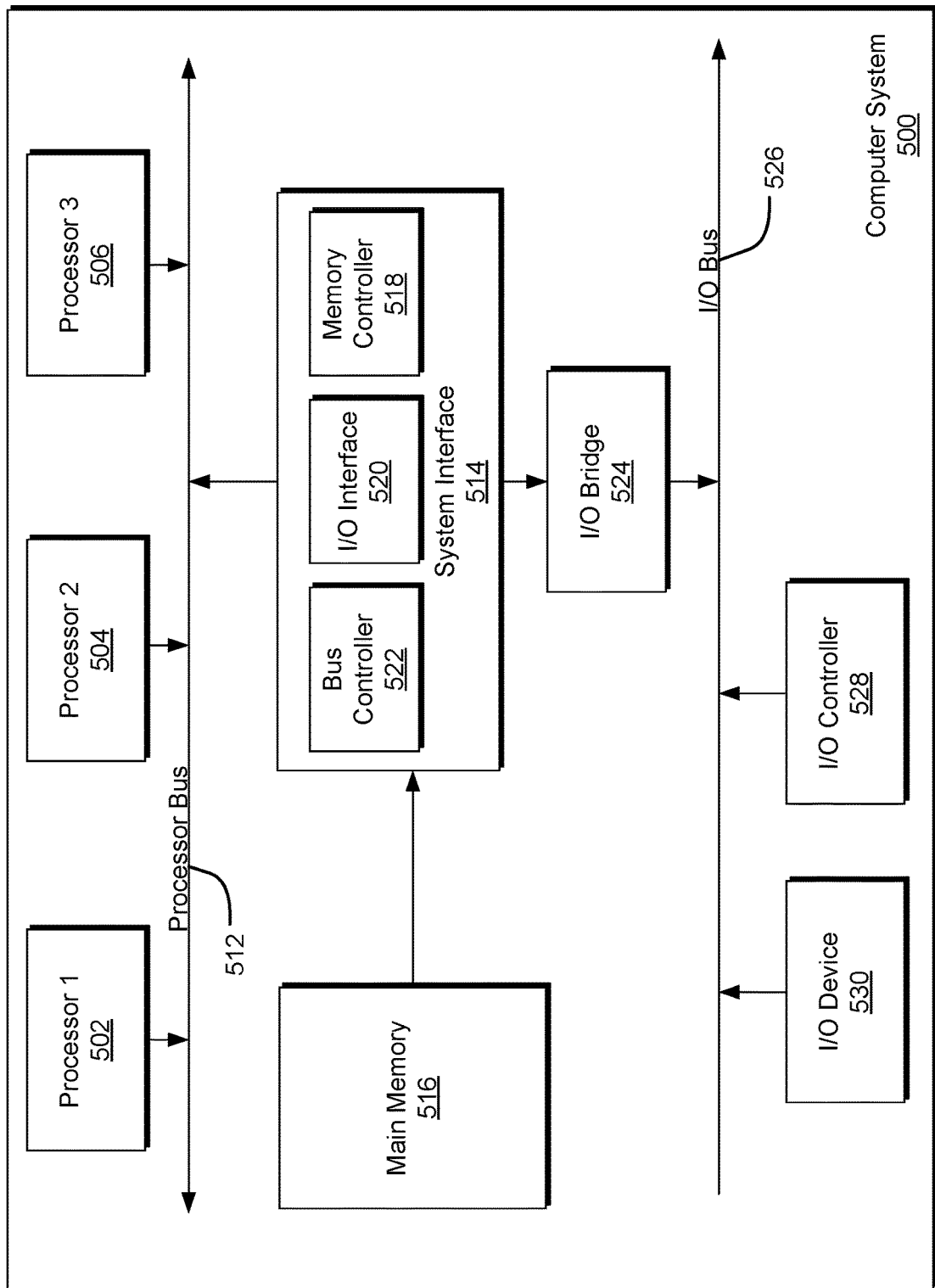
FIG. 5 is a diagram illustrating an example of a computing system which may be used in implementing embodiments of the present disclosure.

FIG. 4 is a flowchart of a method 400 for utilizing a statistical filter on requests received at a cache node 112 of a CDN 102 to determine which requests are tracked by the CDN or node. In general, the operations of the method 400 may be performed by a cache device or cache node 112 of a CDN 102. However, any component of the CDN 102 or in communication with the CDN may also perform one or more of the operations described. Further still, a controlling component of the CDN 102 may execute the operations of the described method 200.

The method begins in operation 402 when the cache device or node 112 receives a request from a requesting device 104 for content from the cache server, as described above. In operation 404, the cache device 112 determines if the resource being requested is already cached and/or being tracked by the cache device. For example, a previous request for the resource may have been received such that the cache device or node includes a request counter and resource identification for that particular requested resource. In one implementation, the tracking of requests for a resource includes storing an indication of the resource (such as a URL of the resource) and a counter associated with the resource into a storage device associated with the cache node 112. Thus, the cache 112 may determine if the resource is already being tracked by accessing the system memory and looking for the URL or other identifier for the resource.

In operation 406, the cache device applies a statistical sampling filter to the request if the resource is not being tracked by the cache device. In general, the sampling filter operates to allow some number of received requests to be tracked by the cache node 112 that is less than all of the received requests. In particular, the cache node 112 tracks the received requests (through the popularity counter associated with the resource) if one request for the resource passes through the statistical sampling filter. Various implementations of the statistical sampling filter are described in more detail below. Once the filter is applied to the request and the cache node determines that the resource is to be tracked, the cache device stores and tracks requests that are received at the cache node 112 in operation 408. In one implementation, the storing and tracking of the resource request includes storing the URL at which the resource is available in cache system memory and associating a counter with the URL. If the request does not pass through the filter, however, the cache device may not track the received request. In this manner, some of the received requests are tracked at the cache device 112 while others are not tracked. This operates to lessen the total number of resource requests that are tracked by the cache device 112, thereby freeing up system memory from potential tracking of unpopular resources in the cache system memory.

In one particular implementation, the statistical filter for filtering out tracking of resources in the cache device can operate based on a combination of randomness and/or a popularity curve. For example, if 10% of all data requests result in caching, and 90% of all data requests do not result in caching, systems configured with this filter are implemented to have a 10% chance of storing any individual request's metadata. However, for a system that receives a billion or more requests, tracking 10% of such requests may provide the proper balance to request filtering as desired by a system administrator. In general, the target percentage of received requests to allow through the statistical filter may be selected as any percentage desired by an administrator or device of the CDN 102.

To execute one particular statistical filter of the cache node 112, a request may be received at the node and a random number between 1 and 100 may be generated. If the random number is above a threshold value (such as value 10), the metadata associated with the request (and any associated counting of the individual request to determine popularity) is ignored. However, if the random number is at or below threshold value 10, the metadata associated with the request (and any count associated with the resource) is stored. This is but a simple example of a statistical filter that may be applied at a cache node 112 of a CDN 102. Those of ordinary skill in the art will recognize other filtering mechanisms that may be utilized to reduce the number of resource requests that are tracked and stored by the cache node 112.

Over time, the statistical filter operates to produce statistically similar results as counting each individual resource (i.e., knowing which resources are popular), but with the benefit of reducing the number of server resources required to track the data. For example, the most popular resources will receive hundreds or thousands of requests from various requesting devices connected to the CDN 102. Thus, it is statistically likely that at least one of those requests pass through the filter such that tracking of the resource requests may be conducted by the cache node 112. Alternatively, the cache node 112 may receive only a few requests for resources that are not popular such that it is statistically likely that these requests will be filtered out and not stored or tracked in the cache device storage. In this manner, requests for the most popular resources may be tracked without requests for less popular resources consuming large amounts of storage space in the cache node 112. Further, this filtering process may be used with the concepts of dynamic popularity thresholds, cache pressure monitoring, and promotion/demotion as outlined above.

Although discussed above with reference to a random number generator, any type of statistical sampling filter may be used. Further, the filter may be tuned to be more or less inclusive as desired by an operator of the cache device or the cache device itself. For example, the cache device may track only one in every 100 resource requests at some times, and one in every 10 resources requests at other times. Further, the tuning of the filter may be based on other metrics or calculations performed by the cache device. For example, if the cache pressure is measured to be high, the filter may be tuned to be less inclusive (or track fewer resource requests) to ease the tracking of the resources by the cache device. Alternatively, the filter may be tuned to be more inclusive to track resources, perhaps when a measurement of the system memory usage is determined to be low. In general, any performance measurement may be utilized by the cache device in tuning the filter.

Through the schemes discussed above, the cache device or node 112 may enhance the caching of resources at the edge server or other cache device. In this manner, more efficient caching of resources may be performed to improve the overall performance of the CDN 102.

FIG. 4 is a block diagram illustrating an example of a computing device or computer system 400 which may be used in implementing the embodiments of the network disclosed above. In particular, the computing device of FIG. 4 is one embodiment of the server or other networking component that performs one of more of the operations described above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be extended to all types of backup networks, and are not exclusive to content delivery networks. Various modifications and changes may be made to the principles described herein without following the example embodiments and applications illustrated and described herein, and without departing from the spirit and scope of the disclosure.

What is claimed is:

1. A method for operating a telecommunications network comprising:
   determining a percentage of storage capacity at a cache node of a content delivery network (CDN);
   determining lifetime available writes for the cache node, wherein lifetime available writes comprises a total amount of data that can be written to the cache node before the cache node must be replaced;
   scaling a resource caching popularity threshold value based on both the determined percentage of storage capacity at the cache node and cache pressure for the cache node, wherein scaling the resource caching popularity threshold value comprises determining a threshold popularity above which a particular resource will be cached at the cache node, and wherein cache pressure for the cache node is a function of a ratio between total writes to the cache node and the lifetime available writes to the cache node;
   caching the particular resource in a cache node storage system when a resource popularity counter exceeds the scaled resource caching threshold value, wherein the cache node storage system comprises a first type of storage drive and a second type of storage drive, the first type of storage drive different than the second type of storage drive;
   storing a first resource in the first type of storage drive; and
   storing a second resource different from the first resource in the second type of storage drive.

2. The method of claim 1 wherein the percentage of storage capacity at the cache node is within a first range of storage capacity percentages and scaling the resource caching popularity threshold value based on the determined percentage of storage capacity at the cache node comprises:
   applying a first scaling factor to the resource caching popularity threshold value, the first scaling factor corresponding to the first range of storage capacity percentages.

3. The method of claim 2 wherein the percentage of storage capacity at the cache node is within a second range of storage capacity percentages and scaling the resource caching popularity threshold value based on the determined percentage of storage capacity at the cache node comprises:
applying a second scaling factor to the resource caching popularity threshold value, the second scaling factor corresponding to the second range of storage capacity percentages and different than the first scaling factor.

4. The method of claim 1 further comprising:
promoting the first resource from the first type of storage drive to the second type of storage drive when a popularity index for the first resource is greater than the resource caching popularity threshold value.

5. The method of claim 1 further comprising:
demoting the second resource from the second type of storage drive to the first type of storage drive when a popularity index for the second resource is less than or equal to the resource caching popularity threshold value.

6. The method of claim 1 further comprising:
applying a request for the particular resource available from the CDN to a statistical sampling filter; and
generating the resource popularity counter for the particular resource if the request succeeds the statistical sampling filter.

7. The method of claim 6 wherein the statistical sampling filter comprises generating a random number value and passing the request for the particular resource available from the CDN through the statistical sampling filter if the random number value is less than a filter threshold value.

8. A networking system comprising:
at least one communication port for receiving requests for content maintained by a content delivery network (CDN);
a storage system for storing content of the CDN, wherein the storage system comprises a first type of storage drive and a second type of storage drive, the first type of storage drive different than the second type of storage drive;
a processing device; and
a nontransitory computer-readable medium operably connected to the processing device, the nontransitory computer-readable medium configured to store instructions that, when executed by the processing device, cause the processing device to perform the operations of:
determining a percentage of storage capacity at the storage system;
determining lifetime available writes for the storage system, wherein lifetime available writes comprises a total amount of data that can be written to the storage system before the storage system must be replaced;
scaling a content caching popularity threshold value for the storage system based on both the determined percentage of storage capacity and cache pressure for the storage system, wherein scaling the content caching popularity threshold value comprises determining a threshold popularity above which particular content will be cached at the storage system, and wherein cache pressure for the cache node storage system is a function of a ratio between total writes to the cache node storage system and the lifetime available writes to the cache node storage system;
caching the particular content in the storage system when a content popularity counter exceeds the scaled content caching threshold value;
storing a first resource in the first type of storage drive; and
storing a second resource different from the first resource in the second type of storage drive.

9. The networking system of claim 8 wherein
the first type of storage drive is a solid state type memory drive storing the first resource;
the second type of storage drive is a hard disk type memory drive storing the second resource.

10. The networking system of claim 9 wherein the processing device further performs the operation of:
promoting the second resource from the hard disk type memory drive to the solid state type memory drive when a popularity index for the second resource is greater than the resource caching popularity threshold value.

11. The networking system of claim 9 wherein the processing device further performs the operation of:
demoting the first resource from the solid state type memory drive to the hard disk type memory drive when a popularity index for the first resource is less than or equal to the resource caching popularity threshold value.

12. The networking system of claim 8 wherein the percentage of storage capacity is within a first range of storage capacity percentages and scaling the content caching popularity threshold value comprises:
applying a first scaling factor to the content caching popularity threshold value, the first scaling factor corresponding to the first range of storage capacity percentages.

13. The networking system of claim 12 wherein scaling the content caching popularity threshold value with the first scaling factor results in a scaled content caching popularity threshold value that is less than an initial content caching popularity threshold value.

14. The networking of claim 12 wherein the percentage of storage is within a second range of storage capacity percentages and scaling the content caching popularity threshold value comprises:
applying a second scaling factor to the content caching popularity threshold value, the second scaling factor corresponding to the second range of storage capacity percentages and different than the first scaling factor.

15. The networking system of claim 14 wherein scaling the content caching popularity threshold value with the second scaling factor causes the scaled content caching popularity threshold value to increase.

16. The networking system of claim 8 wherein the processing device further performs the operations of:
applying a statistical sampling filter to a request for the particular content; and
generating the content popularity counter for the particular content if the request passes the statistical sampling filter.

17. The networking system of claim 16 wherein the statistical sampling filter comprises generating a random number value and passing the request for the particular content through the statistical sampling filter if the random number value is less than a filter threshold value.

* * * * *